(12) United States Patent
Iwata et al.

(10) Patent No.: US 8,228,914 B2
(45) Date of Patent: Jul. 24, 2012

(54) ROUTE SELECTING METHOD AND ROUTER APPARATUS

(75) Inventors: Waki Iwata, Kawasaki (JP); Katsuya Tsushita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 257 days.

(21) Appl. No.: 12/621,740

(22) Filed: Nov. 19, 2009

(65) Prior Publication Data
US 2010/0061373 A1    Mar. 11, 2010

Related U.S. Application Data

(63) Continuation of application No. PCT/JP2007/061604, filed on Jun. 8, 2007.

(51) Int. Cl.
*H04L 12/56* (2006.01)
(52) U.S. Cl. .................. 370/392; 370/412
(58) Field of Classification Search .............. None
See application file for complete search history.

(56) References Cited

U.S. PATENT DOCUMENTS

| | | | |
|---|---|---|---|
| 5,905,725 A * | 5/1999 | Sindhu et al. | 370/389 |
| 6,836,479 B1 | 12/2004 | Sakamoto et al. | |
| 7,613,184 B2 * | 11/2009 | Chiruvolu et al. | 370/392 |
| 7,869,441 B2 | 1/2011 | Sakamoto et al. | |
| 2003/0002438 A1 * | 1/2003 | Yazaki et al. | 370/229 |
| 2003/0002534 A1 | 1/2003 | Hoof | |
| 2004/0228274 A1 * | 11/2004 | Yazaki et al. | 370/229 |
| 2006/0114924 A1 | 6/2006 | Yazaki et al. | |

FOREIGN PATENT DOCUMENTS

| | | |
|---|---|---|
| JP | 10-84350 | 3/1998 |
| JP | 2000-232482 | 8/2000 |
| JP | 2000-244570 | 9/2000 |
| JP | 2003-018187 | 1/2003 |
| JP | 2003-018198 | 1/2003 |

OTHER PUBLICATIONS

International Search Report dated Jul. 10, 2007, from the corresponding International Application.
Japanese Office Action dated Aug. 2, 2011, from corresponding Japanese Application No. 2009-517668.
Examiner's Decision of Rejection dated Nov. 8, 2011, from corresponding Japanese Application No. 2009-517668.

* cited by examiner

*Primary Examiner* — Brian Roberts
(74) *Attorney, Agent, or Firm* — Fujitsu Patent Center (57) ABSTRACT

A route selecting method includes performing a route search for obtaining route information from destination information contained in a received packet; attaching the route information obtained by the route search to the received packet; storing the packet having the route information in a buffer; reading the packet stored in the buffer sequentially from the route information attached to the packet; selecting an output route for the packet read from the buffer based on the route information read from the buffer; and outputting the packet via the selected output route.

6 Claims, 8 Drawing Sheets

| 6 bytes | 6 bytes | 2 bytes | 46 – 1500 bytes | 4 bytes |
|---|---|---|---|---|
| DA | SA | TYPE | DATA | FCS |

FIG.3B

| 1 byte | 6 bytes | 6 bytes | 2 bytes | 46 – 1500 bytes | 4 bytes |
|---|---|---|---|---|---|
| IF | DA | SA | TYPE | DATA | FCS |

ROUTE SELECTING METHOD AND ROUTER APPARATUS

CROSS-REFERENCE TO RELATED APPLICATIONS

This application is a U.S. continuation application filed under 35 USC 111(a) claiming benefit under 35 USC 120 and 365(c) of PCT application JP07/061604, filed Jun. 8, 2007. The foregoing application is hereby incorporated herein by reference.

FIELD

The present invention generally relates to a route selecting method and router apparatus for selecting an output route based on destination information contained in a received packet.

BACKGROUND

Figure 1:
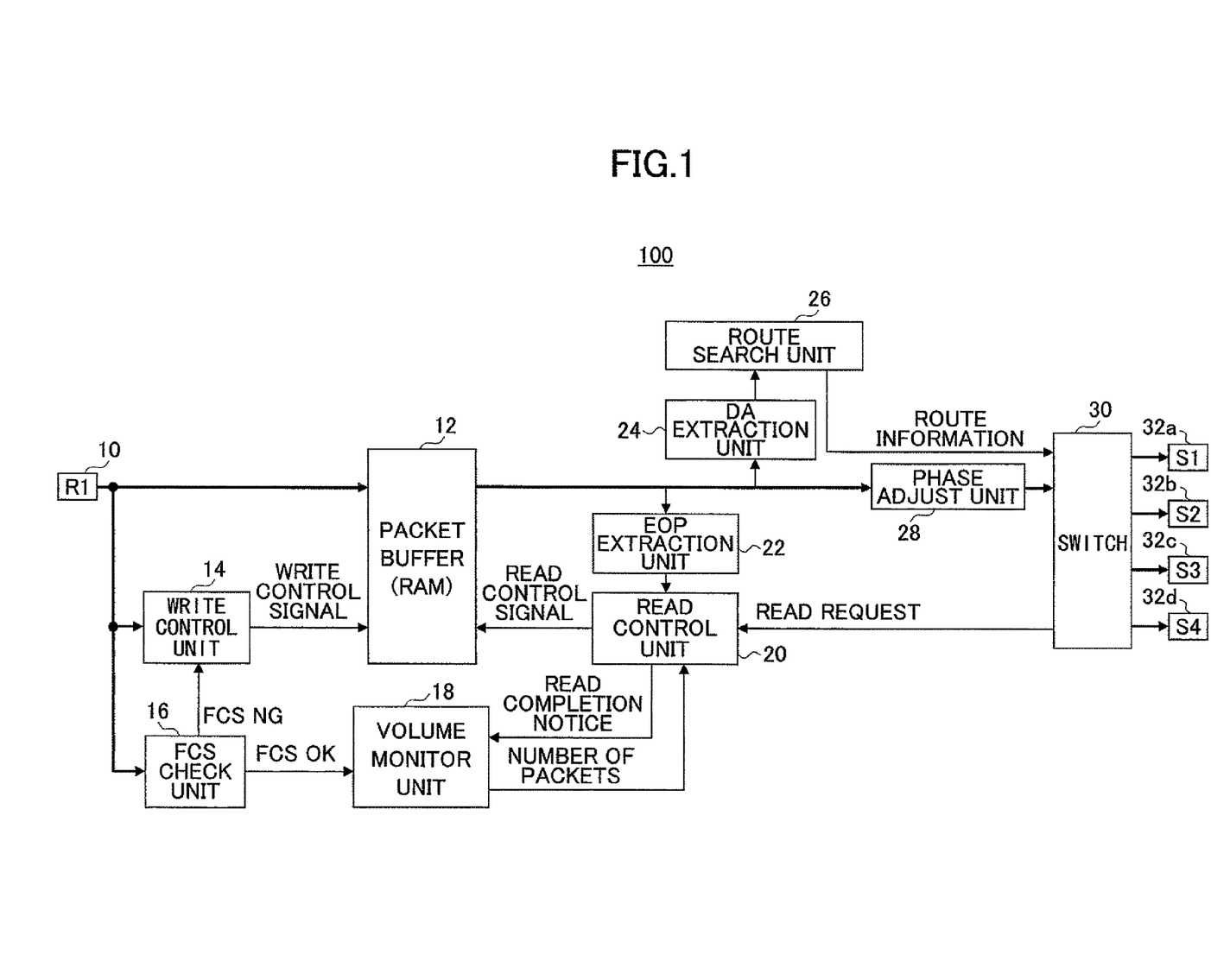
FIG. 1 is a block diagram of a router apparatus according to the related art.

A router apparatus is known that enables data communication between computers or the like via the Internet or an intranet, for example, by connecting a local area network ("LAN") and a wide area network ("WAN") in a client/server model, for example. FIG. 1 depicts a block diagram of a router apparatus 100 according to the related art. A packet is received at a reception port 10 and then supplied to a packet buffer 12, a write control unit 14, and an FCS (frame check sequence) checking unit 16. The write control unit 14 writes the received packet in the packet buffer 12 while supplying a write control signal including a write address to the packet buffer 12. The FCS checking unit 16 performs an FCS check on the received packet to check for errors in the received packet. If there is an error, the packet is discarded; if there is no error, the number of packets accumulated in the packet buffer 12 that is monitored by a volume monitoring unit 18 is incremented.

In the packet buffer 12, SOP (Start Of Packet) and EOP (End Of Packet) indicators indicating the start and the end, respectively, of the packet are also written as parallel information in the packet buffer 12, together with packet data. The parallel information is also read when the packet data is read.

The volume monitoring unit 18 reads the number of accumulated packets in the packet buffer 12 and notifies a control unit 20. If the number of accumulated packets is plus (greater than zero), the read control unit 20 reads a packet from the packet buffer 12 while supplying a read control signal, including a read address, to the packet buffer 12. The packet read from the packet buffer 12 together with the parallel information SOP and EOP is supplied to an EOP extracting unit 22, a DA (destination address) extracting unit 24, and a phase adjusting unit 28. Upon extraction of the EOP indicator indicating the end of the packet, the EOP extracting unit 22 notifies the read control unit 20.

The DA extracting unit 24 extracts the DA of the packet read from the packet buffer 12 and supplies the DA to a route search unit 26. The route search unit 26 searches its own internal route search table with reference to the DA, and supplies obtained route information to a switch 30. A phase adjusting unit 28 performs phase adjustment by delaying the packet by a time required for route search before supplying the packet to the switch 30. The switch 30 selects one of transmit ports 32a through 32d in accordance with the route information, and then outputs the packet via the selected transmit port.

Japanese Laid-Open Patent Application No. 2000-244570 discloses that a received packet is stored in a packet buffer by a forwarding engine, and header information is stored in a header RAM. A search engine searches the header information for forwarding control information and writes the forwarding control information in the header RAM. Based on the information from the packet buffer and the header RAM, an output packet is generated by the forwarding engine and outputted to a forwarding destination.

In the method discussed with reference to FIG. 1, the packet is first written in the packet buffer 12 and then the destination information DA is read from the packet buffer 12 in order to obtain route information using the route search unit 26. As a result, delivery of the packet is delayed by the time required for the route search that is conducted after the packet is read from the packet buffer 12.

SUMMARY

According to one aspect of the present invention, a route selecting method include performing a route search for obtaining route information from destination information contained in a received packet; attaching the route information obtained by the route search to the received packet; storing the packet having the route information in a first buffer; reading the packet stored in the first buffer sequentially from the route information attached to the packet; selecting a first output route based on the route information read from the first buffer; and outputting the packet read from the first buffer via the first output route.

According to another aspect of the present invention, a router apparatus includes a route search unit configured to obtain route information from destination information contained in a received packet; a first buffer unit configured to store the received packet while the route information obtained by the route search unit is attached to the packet; a first read unit configured to read the packet stored in the first buffer unit sequentially from the route information attached to the packet; and a first switch unit configured to select a first output route based on the route information read by the first read unit from the first buffer unit, and configured to output the packet read by the first read unit from the first buffer unit via the first output route.

The object and advantages of the disclosure will be realized and attained by means of the elements and combinations particularly pointed out in the claims.

It is to be understood that both the foregoing general description and the following detailed description are exemplary and explanatory and are not restrictive of the invention as claimed.

DESCRIPTION OF EMBODIMENTS

Referring now to the drawings, wherein like reference numerals designate identical or corresponding parts throughout the several views, embodiments of the present invention are described.

<Packet Buffer and Route Search Unit>

Figure 2:
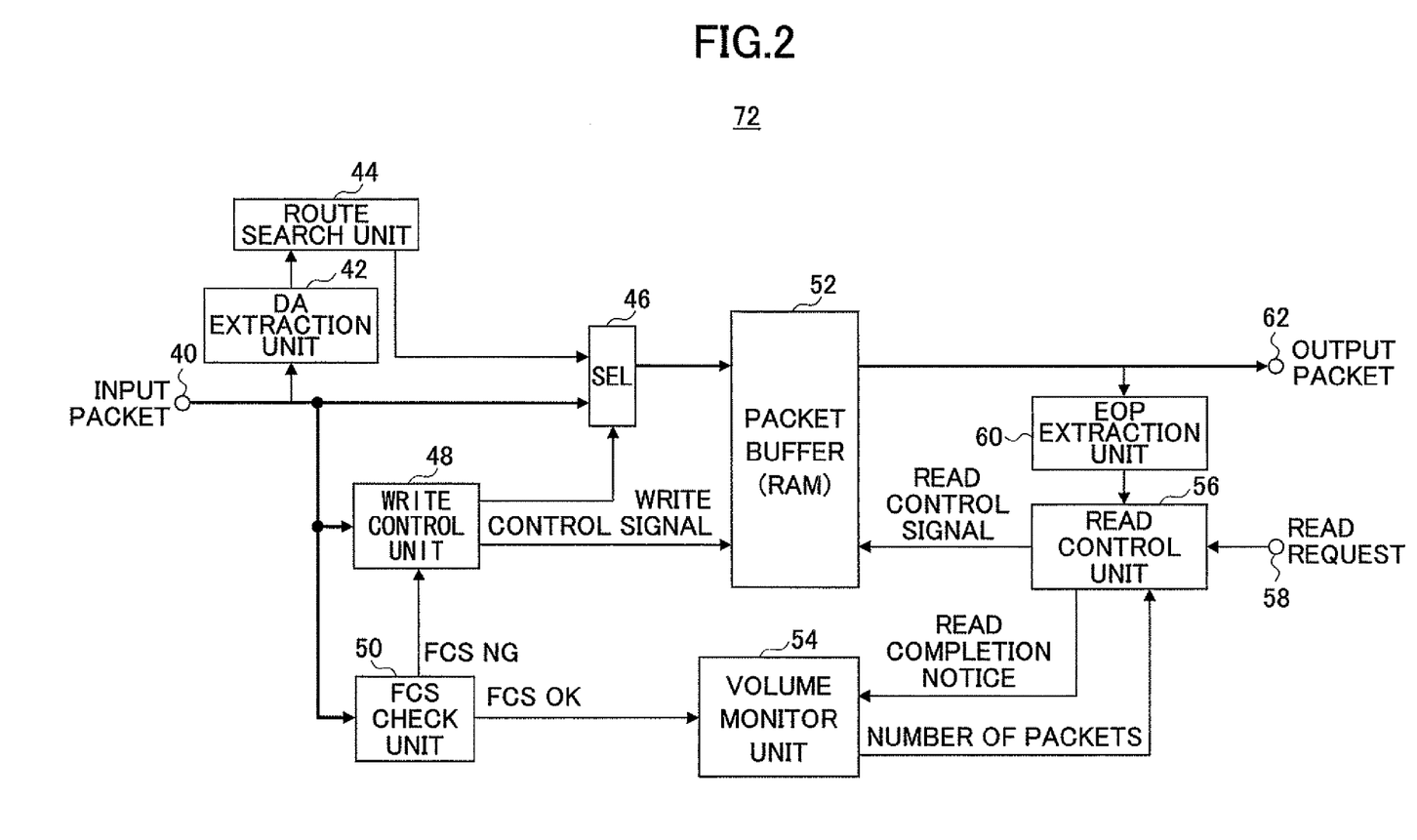
FIG. 2 is a block diagram illustrating a packet buffer and a route search unit according to an embodiment of the present invention.

FIG. 2 is a block diagram illustrating a packet buffer 52 and a route search unit 44 in a packet buffer/route search unit 72 of a router apparatus according to an embodiment of the present invention, which may be used to realize a route selecting method according to an embodiment of the present invention. An input packet received at a terminal 40 is supplied to a DA extracting unit 42, a selector 46, a write control unit 48, and an FCS checking unit 50.

The DA extracting unit 42 extracts the DA (destination address) of the input packet and supplies the DA to the route search unit 44. The route search unit 44 searches an internal route search table with reference to the DA, and supplies obtained route information (such as the physical port number of a transmit port) to the selector 46.

The write control unit 48 is supplied, from a packet detecting unit (not illustrated), with SOP and EOP indicators indicating the start and end, respectively, of the packet received at the terminal 40. The write control unit 48 generates a selection signal based on the SOP and EOP indicators and supplies the selection signal to the selector 46. The selector 46 selects an input packet from the terminal 40 during a packet input period in accordance with the selection signal, selects route information from the route search unit 44 after the input of the packet, and supplies the packet and the route information to the packet buffer 52.

The write control unit 48 supplies a write control signal including a write address to the packet buffer 52, and writes the packet and route information supplied from the selector 46 in the packet buffer 52. The SOP and EOP indicators indicating the start and end, respectively, of the packet are written as parallel information in the packet buffer 52, together with the packet data. The parallel information is also read when the packet data is read.

The various units of the packet buffer/route search unit 72 depicted in FIG. 2 may be ay be controlled by a CPU as will be described later.

Figure 3A:
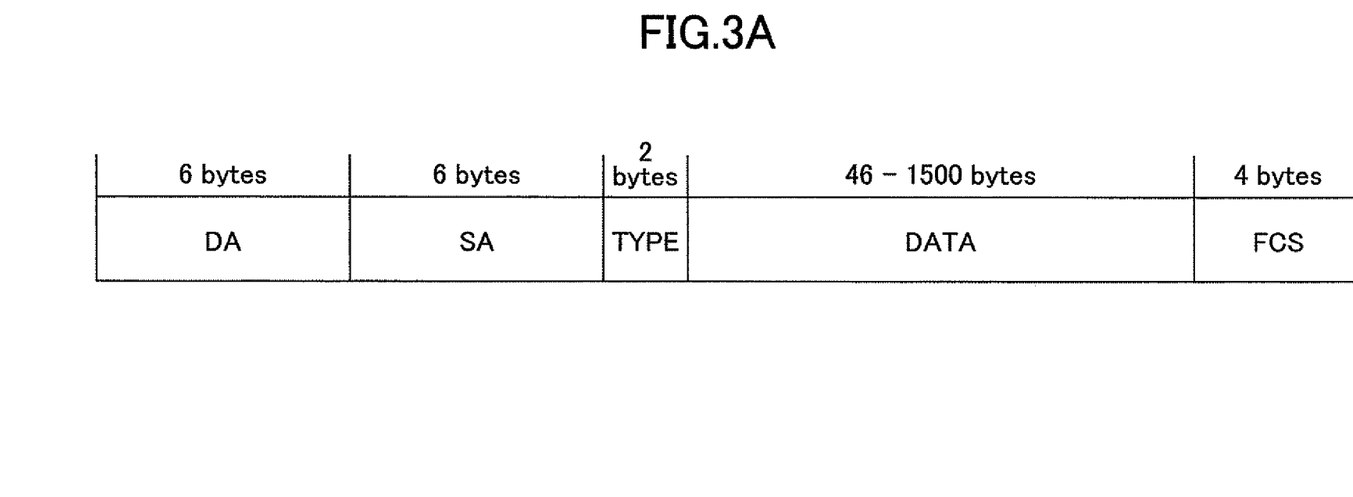
FIG. 3A depicts a format of an input packet.
Figure 3B:
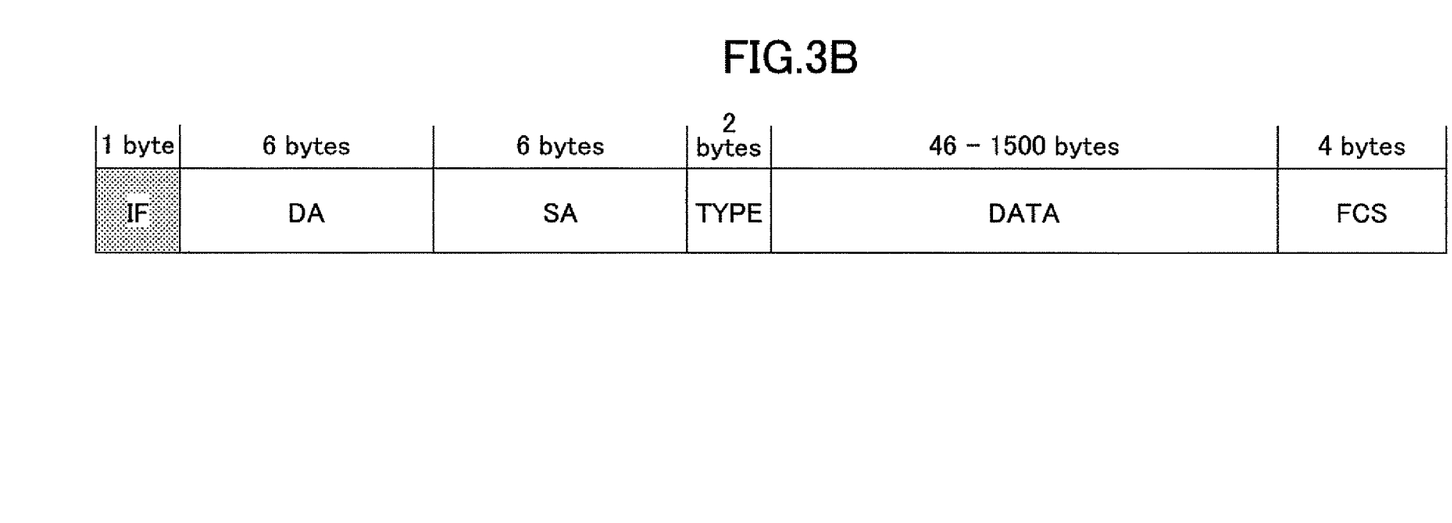
FIG. 3B depicts a format of a packet that is stored in a packet buffer.

FIG. 3A depicts a format of an input packet supplied to the terminal 40. The input packet includes 6 bytes of DA; 6 bytes of SA (Source Address); 2 bytes of TYPE (type identifier); 46 bytes or more (and 1500 bytes or less) of DATA; and a FCS (Frame Check Sequence). FIG. 3B depicts a format of a packet stored in the packet buffer 52. In the packet buffer 52, 1 byte of IF (Information Header) for storing route information is attached to the packet of the format of FIG. 3A.

Figure 4:
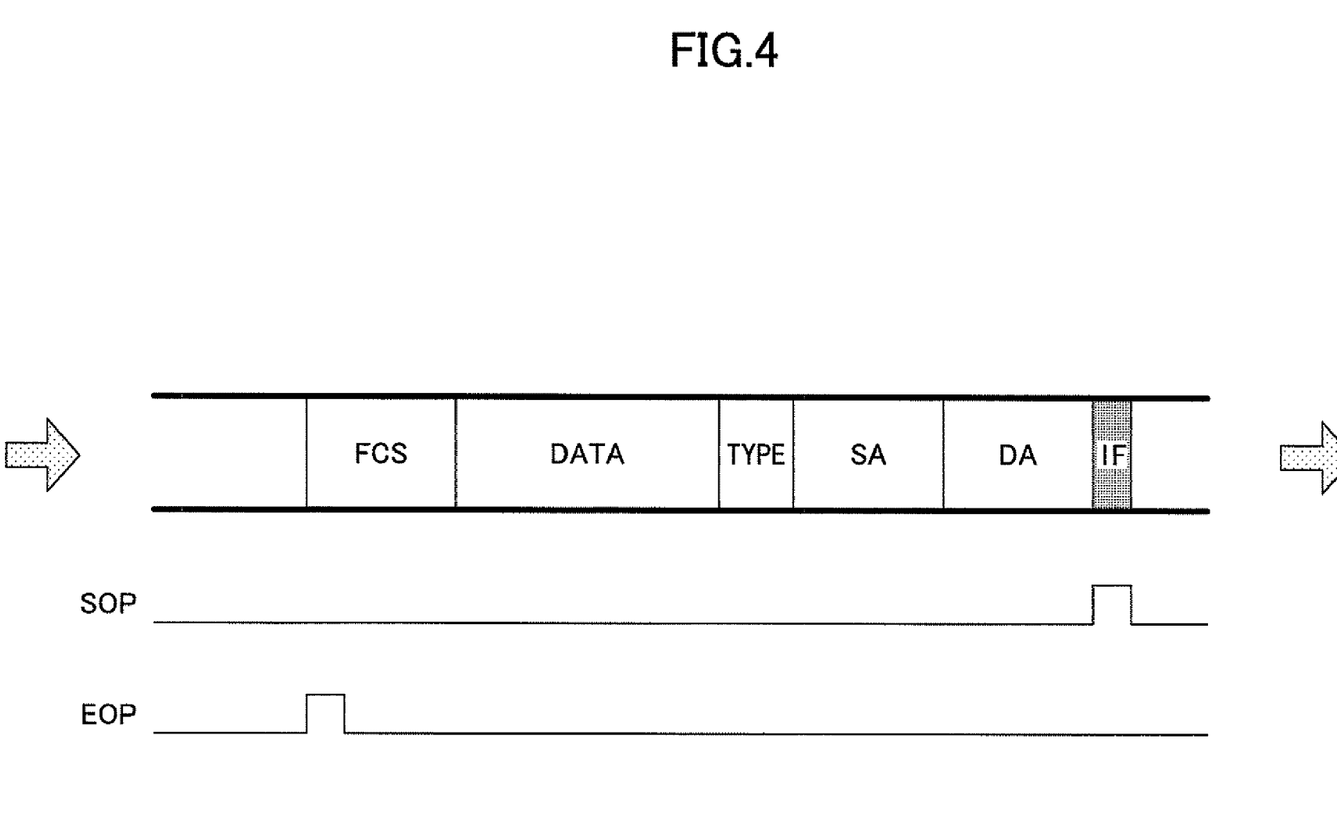
FIG. 4 conceptually illustrates how packet information and parallel information are stored in a packet buffer.

FIG. 4 conceptually depicts how a packet and parallel information SOP and EOP are stored in the packet buffer 52. Initially, DA, SA, TYPE, DATA, and FCS of the input packet are written in the packet buffer 52, leaving IF vacant. Thereafter, route information is written in IF. Upon reading, the packet is read sequentially from IF, DA, SA, TYPE, DATA, and FCS. An FCS check is performed by the FCS checking unit 50 on the received packet to check for errors in the received packet. If there is an error in the received packet, the packet is discarded; if there is no error, the number of packets accumulated in the packet buffer 52 that is monitored by a volume monitoring unit 54 is incremented. The volume monitoring unit 54 then notifies a read control unit 56 of the number of accumulated packets in the packet buffer 52. The volume monitoring unit 54, upon reception of a read completion notice from the read control unit 56, decrements the number of accumulated packets in the route packet buffer 52.

Upon reception of a read request from a subsequent switch via a terminal 58, the read control unit 56 supplies a read control signal including a read address to the packet buffer 52 as long as the number of accumulated packets in the packet buffer 52 is plus, and then reads a packet from the packet buffer 52. The packet including the route information read from the packet buffer 52, together with the parallel information SOP and EOP, is supplied to an EOP extracting unit 60 as well as being outputted via a terminal 62. Upon extraction of the EOP indicator indicating the end of the packet, the EOP extracting unit 60 notifies the read control unit 56.

<Flowchart of Packet Writing Process>

Figure 5:
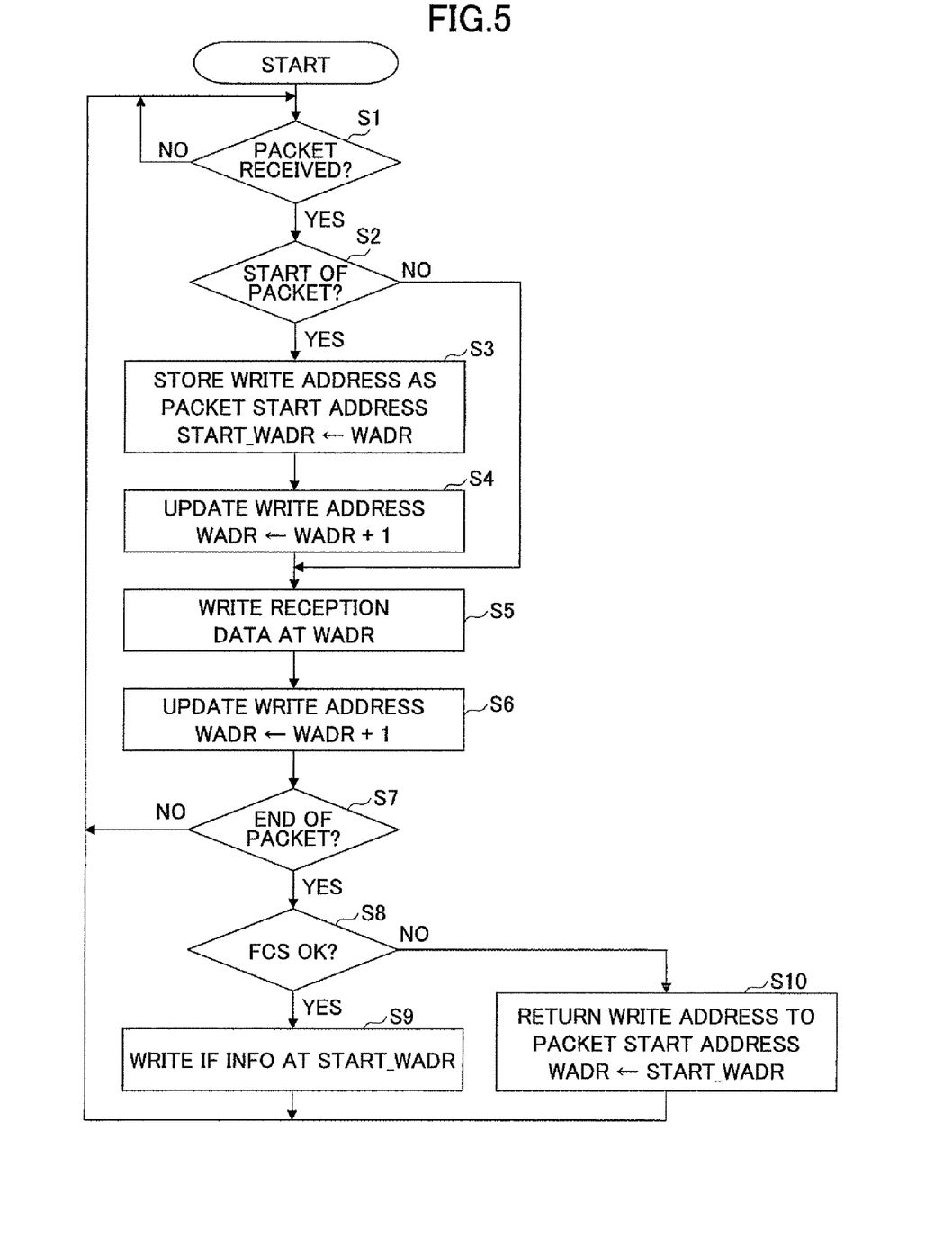
FIG. 5 is a flowchart of a process of writing a packet in a packet buffer.

FIG. 5 is a flowchart of a process of writing a packet in the packet buffer 52 by the write control unit 48. In step S1, the write control unit 48 determines whether a packet is received. If a packet is received, the write control unit 48 determines in step S2 whether the start of packet is detected, based on an SOP indicator from the packet detecting unit (not illustrated).

If the start of packet is detected, a write address WADR is stored in memory in step S3 as a packet start address START_WADR. This step is for a write-back in case the packet has been discarded, and for writing of route information. In step S4, the write address WADR is incremented by one, thus updating the write address WADR.

After step S4, or if the start of packet is not detected in step S2, reception data is written at the write address WADR in the packet buffer 52 in step S5. In step S6, the write address WADR is incremented by one, thus updating the write address WADR. In accordance with the present embodiment, a reception program is written at the write address WADR in the packet buffer 52 on a word by word basis.

In step S7, it is determined whether the end of the packet is detected based on an EOP indicator supplied from the packet detecting unit (not illustrated). If the end of packet is not detected, the routine proceeds to step S1.

If the end of packet is detected, it is determined in step S8 whether an FCS check result from the FCS checking unit 50 indicates an error. If the FCS check result does not indicate an error ("YES"), the route information (IF) is written in step S9 at the write address WADR, and the routine returns to step S1.

On the other hand, if the FCS check result indicates an error ("NO") in step S8, the packet start address START_WADR is returned back to the write address WADR, the received packet is discarded, and the routine returns to step S1.

<1-To-Many Switch Configuration>

Figure 6:
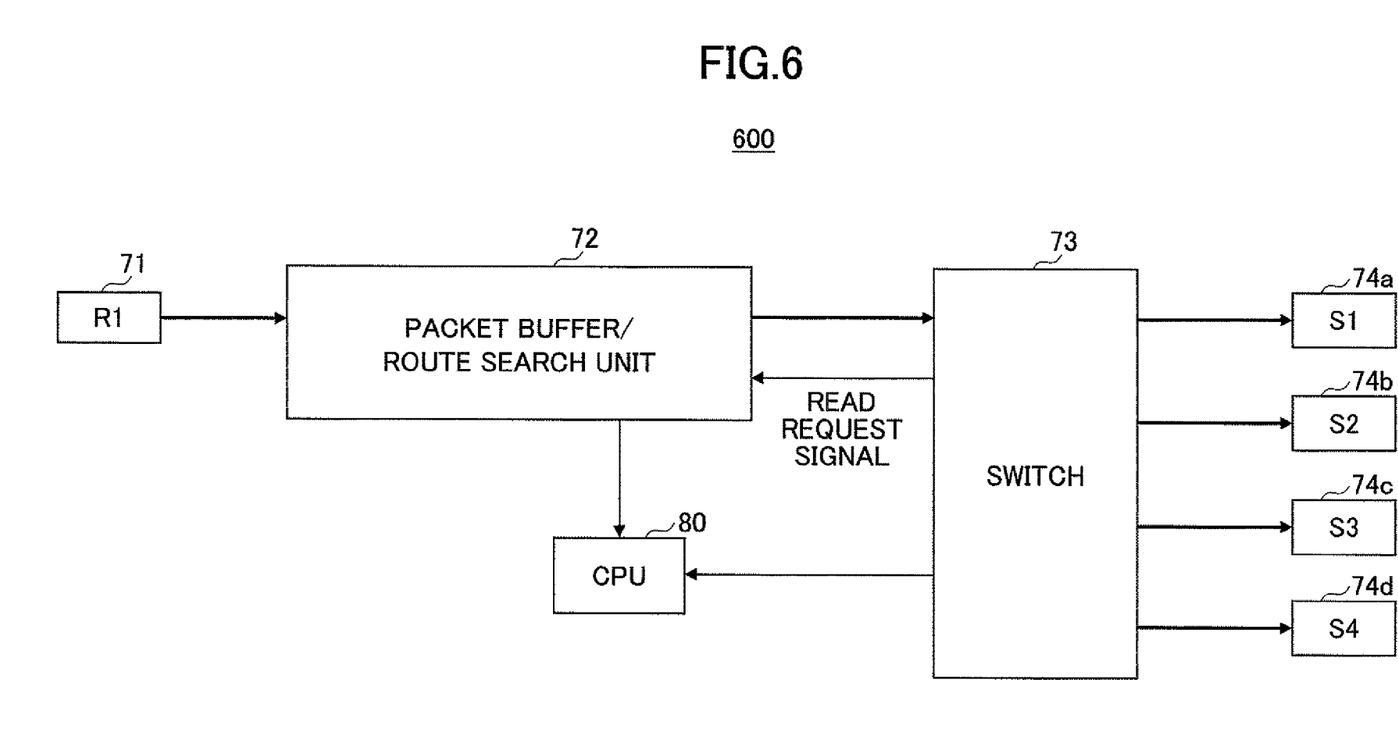
FIG. 6 is a block diagram of a router apparatus having a 1-to-many switch configuration according to an embodiment of the present invention.

FIG. 6 depicts a block diagram of a router apparatus 600 having a 1-to-many switch configuration according to an embodiment of the present invention. A packet received at a reception port 71 is supplied to a packet buffer/route search unit 72 having the configuration of FIG. 2. In the packet buffer/route search unit 72, the DA is extracted and a transmit port is determined by the route search unit 44 while the packet is being written in the packet buffer 52. Route information obtained by the route search unit 44 is stored at the head of packet data after the packet is stored in the packet buffer 52.

When the packet buffer 52 in the packet buffer/route search unit 72 is read in response to a read request signal from a switch 73, the packet data is read sequentially from the route information in IF at the head of the packet, and then supplied to the switch 73. Thus, the switch 73 can immediately switch routes. Furthermore, because the route information is stored in IF at the head of the packet in the packet buffer 52, management of route information can be simplified.

The switch 73 selects any one of transmit ports 74a through 74d based on the route information, and outputs the packet to the selected transmit port. The route information attached at the head of the packet is discarded by the switch 73 upon outputting of the packet via the selected transmit port.

The packet buffer/route search unit 72 and the switch 73 may be controlled by a CPU 80.

<Many-To-Many Switch Configuration>

Figure 7:
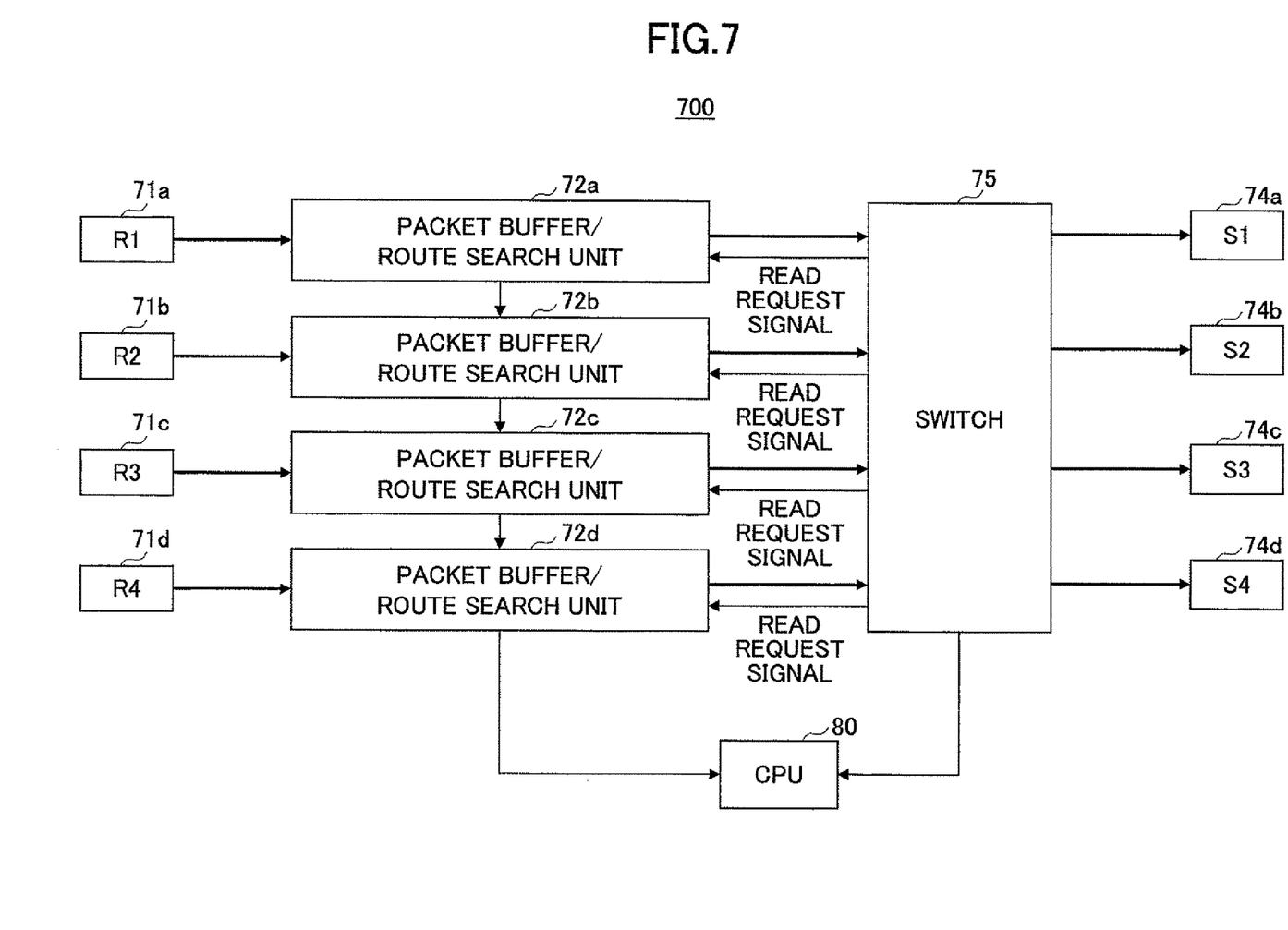
FIG. 7 is a block diagram of a router apparatus having a many-to-many switch configuration according to another embodiment of the present invention.

FIG. 7 depicts a block diagram of a router apparatus 700 having a many-to-many switch configuration according to an embodiment of the present invention. Packets received via reception ports 71a through 71d are supplied to packet buffer/route search units 72a through 72d, respectively, each having the configuration of FIG. 2. Each of the packet buffer/route search units 72a through 72d extracts the DA while writing the packet in the packet buffer 52, and a transmit port is determined by the route search unit 44. Route information obtained by the route search unit 44 is stored at the head of packet data after the packet is stored in the packet buffer 52.

Each of the packet buffer/route search units 72a through 72d reads the route information in IF at the head of the packet from the packet buffer 52 and notifies the switch 75 in advance. The switch 75 selects one of the transmit ports 74a through 74d that is unused in view of the ports' status of use, and issues a read request to the packet buffer/route search unit (one of 72a through 72d) that outputs the packet to the selected transmit port.

Packet data is then read from the packet buffer 52 of the packet buffer/route search unit (one of 72a through 72d) to which the read request signal has been supplied, and the packet data is outputted via the transmit port (one of 74a through 74d) selected by the switch 75. The route information added at the head of the packet is discarded by the switch 75 upon outputting of the packet via the transmit port.

The packet buffer/route search units 72a through 72d and the switch 75 may be controlled by the CPU 80.

<Multi-Stage Switch Configuration>

Figure 8:
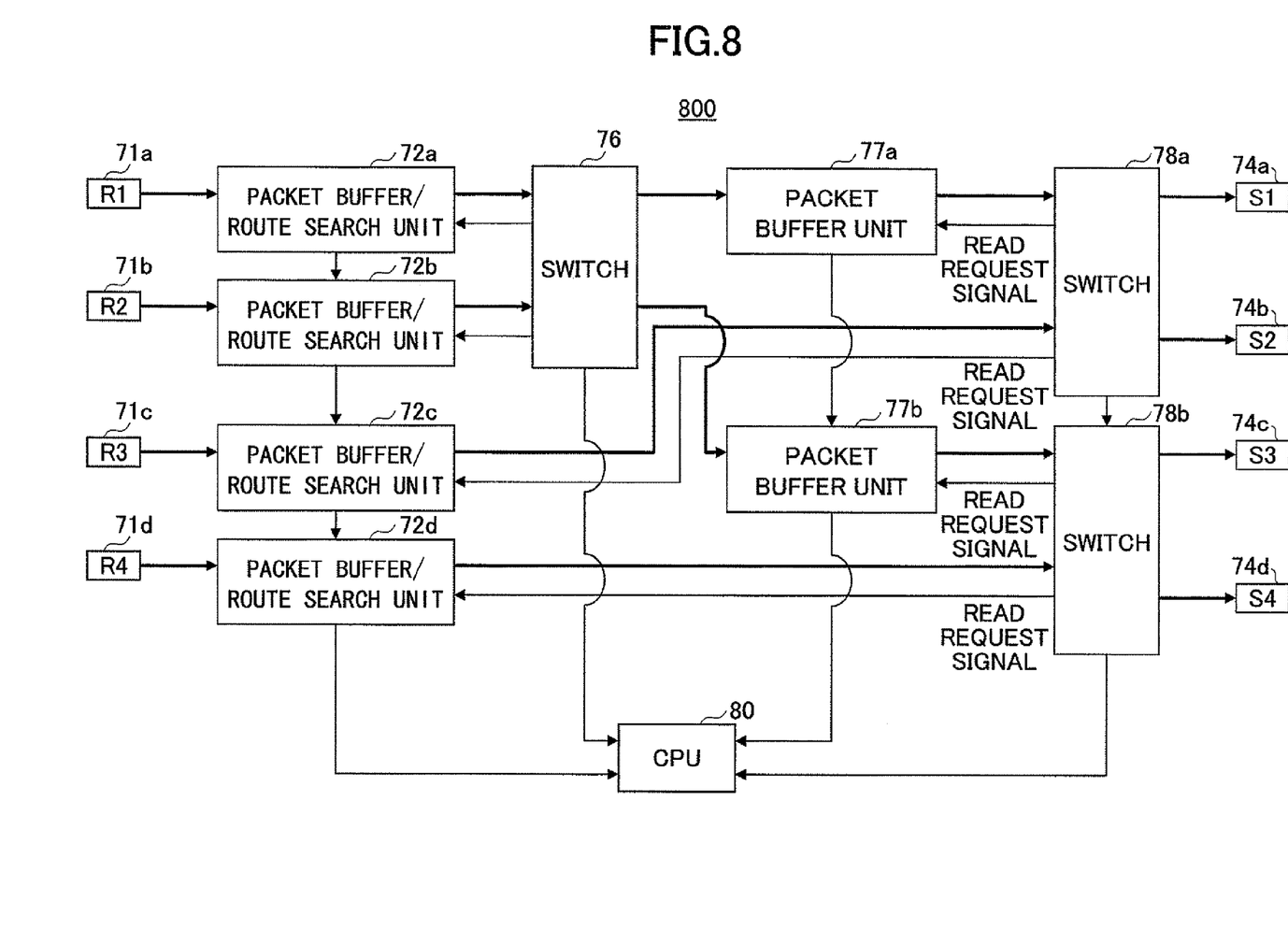
FIG. 8 is a block diagram of a router apparatus having a multi-stage switch configuration according to another embodiment of the present invention.

FIG. 8 depicts a block diagram of a router apparatus 800 having a multi-stage switch configuration according to an embodiment of the present invention. Packets received via reception ports 71a through 71d are supplied to packet buffer/route search units 72a through 72d, respectively, each having the configuration of FIG. 2. Each of the packet buffer/route search units 72a through 72d extracts the DA while writing the packet in the packet buffer 52, and a transmit port is determined by the route search unit 44. Route information obtained by the route search unit 44 is stored at the head of packet data after the packet is stored in the packet buffer 52.

Each of the packet buffer/route search units 72a and 72b, in response to a read request signal from a switch 76, reads packet data sequentially from the route information in IF at the head of the packet, and supplies the packet data to the switch 76. Thus, the switch 76 can immediately switch routes. The switch 76 selects either the packet buffer unit 77a or 77b based on the route information, and supplies the packets read from the packet buffer/route search units 72a and 72b to the selected packet buffer unit 77a or 77b.

Each of the packet buffer units 77a and 77b has the configuration of FIG. 2 with the exception of the DA extracting unit 42, the route search unit 44, and the selector 46. Each of the packet buffer units 77a and 77b stores the packet supplied from the switch 76 to which route information is added in IF at the head of the packet. The packet buffer/route search units 72c and the packet buffer unit 77a read the IF route information from their respective packet buffers 52 and notify the switch 78a in advance. The switch 78a selects either the transmit port 74a or 74b based on their use statuses, and issues a read request to the packet buffer/route search unit 72c or the packet buffer unit 77a that forwards the packet to the selected transmit port.

Thus, packet data is read from the packet buffer 52 of the packet buffer/route search unit 72c or the packet buffer unit 77a that has been supplied with the read request signal, and the packet is outputted to the transmit port (either 74a or 74b) selected by the switch 78a. The route information attached to the head of the packet is discarded by the switch 78a upon outputting of the packet via the selected transmit port.

The packet buffer/route search unit 72d and the packet buffer unit 77b each read the route information in IF at the head of the packet from their respective packet buffers 52, and notify the switch 78b in advance. The switch 78b selects either the transmit port 74c or 74d that is not being used based on their use statuses, and issues a read request to the packet buffer/route search unit 72d or the packet buffer unit 77b that outputs a packet to the selected transmit port 74c or 74d.

Thus, packet data is read from the packet buffer 52 of the packet buffer/route search unit 72d or the packet buffer unit 77b that has been supplied with the read request signal, and then outputted via the transmit port (either 74c or 74d) selected by the switch 78b. The route information added at the head of the packet is discarded by the switch 78b upon outputting of the packet via the selected transmit port.

The packet buffer/route search units 72a through 72d, the switch 76, the packet buffer units 77a and 77b, and the switches 78a and 78b may be controlled by the CPU 80.

In accordance with the present embodiment, when a packet is stored in the packet buffer/route search units 72a through 72d in the first stage, route information is attached to the packet. This eliminates the need for the packet buffer units 77a and 77b, which are provided for timing adjustment in the subsequent stage, to perform a route search process. Furthermore, the speed of route selection control can be increased and the management of route information can be simplified.

It should be obvious to one skilled in the art that the embodiment depicted in FIG. 8 is exemplary and does not limit the present invention. In another embodiment, packets outputted from the packet buffer/route search units 72c and 72d of FIG. 8 may be first stored in packet buffers similar to the packet buffers 77a and 77b of FIG. 8 via a switch, before supplying the packets to the switches 78a and 78b.

Thus, the present invention has been described herein with reference to preferred embodiments thereof. While the present invention has been shown and described with particular examples, it should be understood that various changes and modification may be made to the particular examples without departing from the broad spirit and scope of the present invention as defined in the claims. That is, the scope of the present invention is not limited to the particular examples and the attached drawings.

What is claimed is:

1. A route selecting method comprising:
performing a frame check sequence (FCS) check of a received packet;
storing the received packet in a first buffer when there is no error based on the FCS check;

performing a route search for obtaining route information from destination information contained in the received packet while the received packet is being written in the first buffer;

attaching the route information obtained by the route search to the received packet after the received packet is stored in the first buffer;

reading the packet stored in the first buffer sequentially from the route information attached to the packet;

selecting a first output route based on the route information read from the first buffer; and outputting the packet read from the first buffer via the first output route.

2. The route selecting method according to claim 1, further comprising performing the route search and the storing of the packet and the route information in the first buffer for a port that receives the packet.

3. The route selecting method according to claim 2, further comprising:

storing the packet having the route information that has been outputted via the first output route in a second buffer;

reading the packet stored in the second buffer sequentially from the route information attached to the packet;

selecting a second output route for the packet having the route information that has been outputted via the first output route; and outputting the packet read from the second buffer via the second output route.

4. A router apparatus comprising: a frame check sequence (FCS) check unit configured to perform an FCS check of a received packet;

a first buffer unit configured to store the received packet in a first buffer when there is no error based on the FCS check;

a route search unit configured to obtain route information from destination information contained in the received packet while the received packet is being written in the first buffer;

a write control unit configured to attach the route information obtained by the route search to the received packet after the received packet is stored in the first buffer;

a first read unit configured to read the packet stored in the first buffer unit sequentially from the route information attached to the packet; and a first switch unit configured to select a first output route based on the route information read by the first read unit from the first buffer unit, and configured to output the packet read by the first read unit from the first buffer unit via the first output route.

5. The router apparatus according to claim 4, wherein the route search unit, the first buffer unit, and the first read unit are provided for a port that receives the packet.

6. The router apparatus according to claim 5, further comprising:

a second buffer unit configured to store the packet having the route information that is outputted from the first switch unit;

a second read unit configured to read the packet stored in the second buffer unit sequentially from the route infor­mation attached to the packet; and a second switch unit supplied with the packet having the route information that is outputted from the first switch unit, wherein the second switch unit is configured to select a second output route based on the route informa­tion of the supplied packet, and configured to output the packet via the second output route.

* * * * *